R. A. ECKBERG.
DEMOUNTABLE RIM.
APPLICATION FILED AUG. 3, 1915.

1,208,932.

Patented Dec. 19, 1916.

Witnesses
A. J. Hague
Adele Sherman

Inventor
Rudolph A. Eckberg.
by Ouvig & Bau attys

UNITED STATES PATENT OFFICE.

RUDOLPH A. ECKBERG, OF DES MOINES, IOWA.

DEMOUNTABLE RIM.

1,208,932.

Specification of Letters Patent.

Patented Dec. 19, 1916.

Application filed August 3, 1915. Serial No. 43,491.

*To all whom it may concern:*

Be it known that I, RUDOLPH A. ECKBERG, a citizen of the United States, and resident of Des Moines, in the county of Polk and State of Iowa, have invented a certain new and useful Demountable Rim, of which the following is a specification.

The object of my invention is to provide a demountable rim for pneumatic tires of simple durable and inexpensive construction.

A further object is to provide such a rim adapted to be made up in sections and so constructed as to make it comparatively easy to connect the sections together or separate them, and also so constructed that when the parts are connected and clamped on the wheel, they will be firmly held by the pressure of the tire against separation and also against removal from the rim of the wheel.

Figure 2:
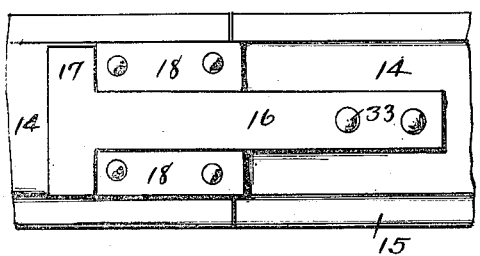
Figure 6:
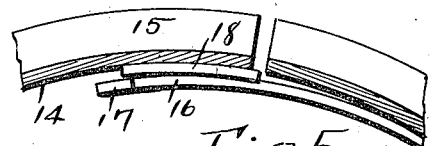
Figure 5:
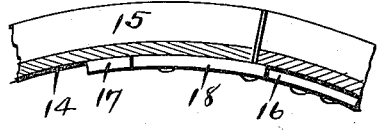
Figure 4:
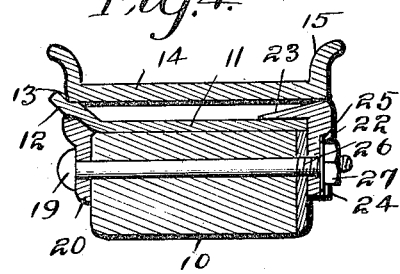
Figure 1:
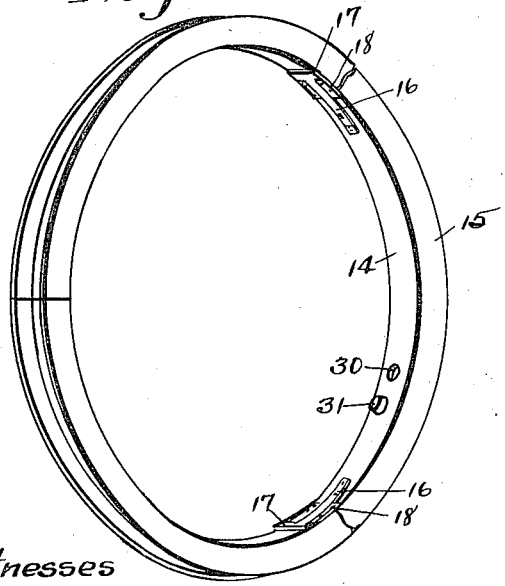
Figure 3:
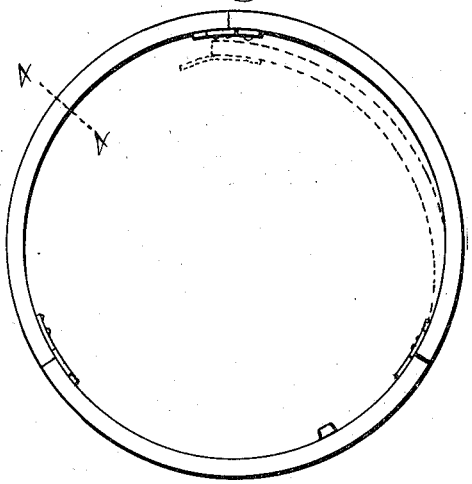

My invention consists in the construction, arrangement and combination of the various parts of the device whereby the objects contemplated are attained, as hereinafter more fully set forth, pointed out in my claim, and illustrated in the accompanying drawings, in which:

Figure 1 shows a perspective view of a demountable rim, embodying my invention. Fig. 2 shows an enlarged plan view of a portion of the inner surface of the rim. Fig. 3 shows a side elevation of the rim, the dotted lines showing the position of one end of one of the sections during the process of separating or assemblying the parts. Fig. 4 shows a vertical sectional view through the rim, taken on the line 4—4 of Fig. 2, and showing the rim installed on the tire. Fig. 5 shows a vertical sectional view through the rim, taken near one side thereof showing the locking plates in side elevation, and Fig. 6 shows a similar view with the key shaped locking plate sprung downwardly and two of the rim sections slightly spread apart.

In the form of my invention, illustrated in the accompanying drawings, I have used the reference numeral 10 to indicate generally the felly of a wheel, having on its outer surface the flat rim 11, at one edge of which is an outwardly inclined member 12, having near its outer end a shoulder 13.

My improved demountable rim comprises an annular flat rim member 14 having at its side edges outwardly extending curved flanges 15, which may be of any suitable size or shape to fit the type of casing which is to be employed with my rim.

My rim is made up of one or more sections, the ends of which are connected with each other in the following manner: Secured to one rim section near the end of such section, is a spring metal locking member 16 projecting considerably beyond the section to which it is secured, and having at its upper end opposite lateral extensions 17. It will be seen that the spring metal locking member 16 is substantially T-shaped. When the rim ends are placed together, the part of the locking member which has the extension 17 overlaps the adjacent rim portion, as clearly shown in Figs. 2, 5 and 6. Secured to the said adjacent rim portion on opposite sides of the locking plate 16, are spaced parallel locking members 18, the ends of which project slightly beyond the end of the rim portion to which they are secured, as shown in Figs. 5 and 6, so that when the ends of the rim are placed together the end of the portion 18 projects over the adjacent rim portion as shown, for instance, in Fig. 5.

In Fig. 1, I have shown a rim, for purposes of illustration, made in three sections. In assembling the rim sections, the two ends of the first two sections are placed together by sliding them longitudinally toward each other until the ends of the members 18 overlap the end of the rim portion to which the member 16 is secured, whereupon the portion 17 may be easily sprung into position engaging the rim portion to which the members 18 are secured. The third rim sections may be secured to one of the two which have been thus assembled by an operation similar to that just described. The last joint is made by placing the ends of rim sections which are to be connected slightly apart, as shown in Fig. 6, the adjacent ends are then brought together in any suitable way as by prying with a screw-driver until the end of the member 18 clears the adjacent part of the adjacent rim section and the portion 17 will spring into position. The rim is assembled within the casing: The rim with the casing mounted thereon can then be placed on the wheel with one edge of the rim 14 resting on the shoulder 13, as shown in Fig. 4. For locking the rim in position on the wheel, a bolt 19 is extended through a lug 20 which fits against the flange 12, as shown in Fig. 4, and also against the felly of the wheel, and is then extended through the felly 10.

On the side of the felly 10, opposite the lug 20, is a locking lug having a member 22 forming a washer member from which the lug and wedge member 23 extends laterally. In the washer portion 22 is a recess 24 receiving a nut 27 on the bolt 19 to permit rotation of the nut. At the bottom of the recess 24 is a laterally extending annular recess 25, of greater diameter than the recess 24 and adapted to receive a washer 26 on the nut 27. The bolt 19 is extended through the downwardly extending portion of the wedge lug 22 and through the end which has been placed in position in the recess 24 with the washer 26, which is of larger diameter than the nut 27 received within the groove 25. The groove 25 and the recess are open at their lower ends to permit the end of a washer to be slid into their position. The nut 27 may then be secured on the bolt with the wedge 23 received between the member 11 and the side edge of the rim 14 opposite the flange 12. It will be seen that a portion of the lug 22 projects beyond the side edge of the rim 14 radially inwardly, and the pressure on the rim 14 will prevent the demountable rim from sliding sidewise after a series of the wedge lugs have been placed in position. When it is desired to remove my demountable rim, the nut 27 is unscrewed, and on account of the fact that the washer 26 travels on the groove 25, the wedge lug will be drawn outwardly until the rim can be slid laterally away from the shoulder 13 and removed from the wheel.

To take the rim apart, a screw driver, or the like, is inserted beneath the edge of the member 17 which is then sprung radially inwardly to the position shown in Fig. 6. A screw driver or the like is then inserted under the projecting edge of one of the members 18 between the adjacent ends of the rim and said ends are forced apart until the end of the rim, to which is secured the member 16, releases the projecting ends of the members 18 and can be forced inwardly. The end of the rim portion which carries the plate 16 is then sprung inwardly until the rim collapses, to the position shown by dotted lines in Fig. 3.

Fig. 6 shows the portion 17 sprung inwardly and the adjacent rim ends sprung apart, and the dotted lines in Fig. 3 show one end of the spring member sprung inwardly to position for allowing the rim to collapse.

When my improved rim is assembled, it is rigidly and firmly locked together and when the casing is placed thereon and the rim is secured on the wheel by means of the wedge lugs, hereinbefore described, or any other suitable means, the rim will be firmly held until properly removed. At the same time my improved rim is easily removed from the wheel, and can be easily collapsed for putting a new casing thereon.

It will be noted that the end of the metal locking members 18, opposite the projecting ends thereof, fit snugly against the member 17 when the rim is assembled, as shown in Figs. 1, 2 and 5. It will be understood that the rim 14 has an ordinary opening 30 to admit a valve casing, and may be provided with lugs 31 to engage a groove or the like in the member 11 for preventing the rim from creeping on the wheel thereby interfering with the valve. It may also be noted in this connection that the member 16 is secured to the rim 14 by means of bolts rivets or the like 33, which are spaced from the end of the rim on which the members 16 are supported to permit the easy spring of the members 16 away from the rim.

It will be understood that some changes may be made in the construction and arrangement of the parts of my improved demountable rim without departing from its essential features and purposes, and it is my intention to cover by this application any such changes which may come within the reasonable scope of my claim.

I claim as my invention.

A demountable rim comprising an annular rim member, transversely split, a metal locking member secured to the inner surface of the rim near one end thereof, having at its projecting end laterally extending portions, plates on the inner surface of the other end of said rim arranged on opposite sides of said projecting locking member and adapted to engage the sides and projecting portions thereof, and also overlap the first mentioned end of said rim.

Des Moines, Iowa, July 14, 1915.

RUDOLPH A. ECKBERG.

Witnesses:
A. SHERMAN,
A. G. HAGUE.